(12) United States Patent
Uchida et al.

(10) Patent No.: US 6,209,212 B1
(45) Date of Patent: Apr. 3, 2001

(54) CENTERING STRUCTURE BETWEEN MACHINE-SIDE SPINDLE AND MOTOR SHAFT AND METHOD OF USING SAME

(75) Inventors: Hiroyuki Uchida; Yukio Katsuzawa, both of Yamanashi; Yasuyuki Nakazawa, Fujiyoshida, all of (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/202,676

(22) PCT Filed: Apr. 30, 1998

(86) PCT No.: PCT/JP98/01993

§ 371 Date: Dec. 18, 1998

§ 102(e) Date: Dec. 18, 1998

(87) PCT Pub. No.: WO98/49764

PCT Pub. Date: Nov. 5, 1998

(30) Foreign Application Priority Data

Apr. 30, 1997 (JP) .................................................. 9-124710

(51) Int. Cl.[7] ...................................................... G01B 5/25
(52) U.S. Cl. .................................. 33/412; 33/520; 33/529
(58) Field of Search ............................. 33/412, 520, 529, 33/533, 613, 644, 645, 661

(56) References Cited

U.S. PATENT DOCUMENTS

| | | | |
|---|---|---|---|
| 3,667,128 | * | 6/1972 | Morgan ................................... 33/529 |
| 4,345,464 | * | 8/1982 | Herzl et al. ............................ 33/644 |
| 5,199,182 | * | 4/1993 | Fowler ................................... 33/412 |
| 5,514,952 | * | 5/1996 | Parkinson ................................ 33/661 |

FOREIGN PATENT DOCUMENTS

| | | |
|---|---|---|
| 63-2105486 | 8/1988 | (JP) . |
| 63-216605 | 9/1988 | (JP) . |
| 64-5750 | 1/1989 | (JP) . |
| 2-27806 | 2/1990 | (JP) . |
| 6-6956 | 1/1994 | (JP) . |
| 6-162730 | 6/1994 | (JP) . |
| 8-19215 | 1/1996 | (JP) . |
| 8-141803 | 6/1996 | (JP) . |
| 8-149740 | 6/1996 | (JP) . |
| 9-117089 | 5/1997 | (JP) . |
| 9-150389 | 6/1997 | (JP) . |

* cited by examiner

Primary Examiner—Christopher W. Fulton

(57) ABSTRACT

A first mounting plate (4) is formed with a ring-shaped projection (6) on its undersurface, facing a through hole (5) in the center. An outer peripheral wall (61) of the projection (6) is finished into the shape of a perfect circle. In mounting a motor (2) on the first mounting plate (4), the position of a motor shaft (3) is adjusted on the basis of the outer peripheral wall (61) of this perfect circle. On the other hand, the upper part of the inner peripheral wall of a second mounting plate 10, which faces a through hole 5 in the center, is formed into an expanded portion (71), and the inner peripheral wall of the expanded portion (71) is finished into the shape of a perfect circle. In attaching a housing (9) of a machine tool to the second mounting plate (10), the position of a main spindle (1) is adjusted on the basis of the inner peripheral wall of this perfect circle. When the projection (6) of the first mounting plate (4) is fitted into the expanded portion (71) of the second mounting plate (10), the axis of the motor shaft (3) and the axis of the main spindle (1) are aligned with each other.

10 Claims, 3 Drawing Sheets

CENTERING STRUCTURE BETWEEN MACHINE-SIDE SPINDLE AND MOTOR SHAFT AND METHOD OF USING SAME

TECHNICAL FIELD

The present invention relates to an improvement of a centering structure between a machine-side spindle and a motor shaft.

BACKGROUND ART

Many of modern machines, especially machine tools in which machine-side spindles including main spindles are rotated at high speed, make use of a drive system in which the machine-side spindles are connected directly to a motor shaft to be rotated thereby. In directly connecting a machine-side spindle and the motor shaft, the connecting operation is carried out by interposing a coupling between them. If centering between the machine-side spindle and the motor shaft is not exact, however, vibration is caused, thus exerting a bad influence on the working accuracy, shortening the life of the machine, or increasing the possibility of production of noises.

In the case where a spindle-through coolant is used, moreover, there is a possibility of the coolant leaking if the machine-side spindle and the center of the motor shaft are not aligned.

There are two known methods for centering the machine-side spindle and the motor shaft. In one method, center misalignment between the spindle and the shaft is measured by means of a measurer attached to the machine-side spindle as adjustment operation is performed to correct the attachment position of the motor. In the other method, the respective center positions of the spindle and the shaft are compulsorily aligned by means of a socket that constitutes a coupling.

According to the former method, however, it is difficult to secure a working space wide enough for measurement operation if the construction of the machine is complicated. In the case of a structure such that the machine-side spindle and the motor shaft are externally closed up tight when the motor is mounted, for example, in the case of a spindle structure of a machine tool or the like, external measurement operation cannot be carried out without regard to the presence the working space.

In the case of the latter method, on the other hand, the center misalignment is not actually measured during the adjustment operation, although the operation itself is easy. Therefore, the tolerance for the center misalignment should be restricted within the limit of about 30 microns at the most, depending on the rigidity of the machine itself and the working accuracy of the socket. This accuracy is not always high enough for spindles that rotate at high speed.

DISCLOSURE OF THE INVENTION

The object of the present invention is to provide a centering structure between a machine-side spindle and a motor shaft, capable of effecting precise centering operation without regard to the structure of a machine.

Additional objects and advantages of the invention will be set forth in part in the description which follows, and, in part, will be obvious from the description, or may be learned by practice of the invention.

In order to achieve the above object, a centering structure between a machine-side spindle and a motor shaft according to the present invention comprises first and second mounting plates each having a through hole bored through the central portion thereof and provided individually with fitting portions adapted to mate with each other with the respective centers of the through holes thereof in alignment, wherein the first mounting plate and a motor is fixed together in a manner such that the center of the through hole of the first mounting plate and the center of the motor shaft are in alignment with each other, the second mounting plate and a housing for the machine-side spindle is fixed together in a manner such that the center of the through hole of the second mounting plate and the center of the machine-side spindle are in alignment with each other, and the first and second mounting plates is caused to mate with each other by means of the fitting portions so that the center of the machine-side spindle and the center of the motor shaft are in alignment with each other.

According to the present invention, centering operation for the machine-side spindle and the motor shaft can be carried out precisely without regard to the construction of the machine.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1A:
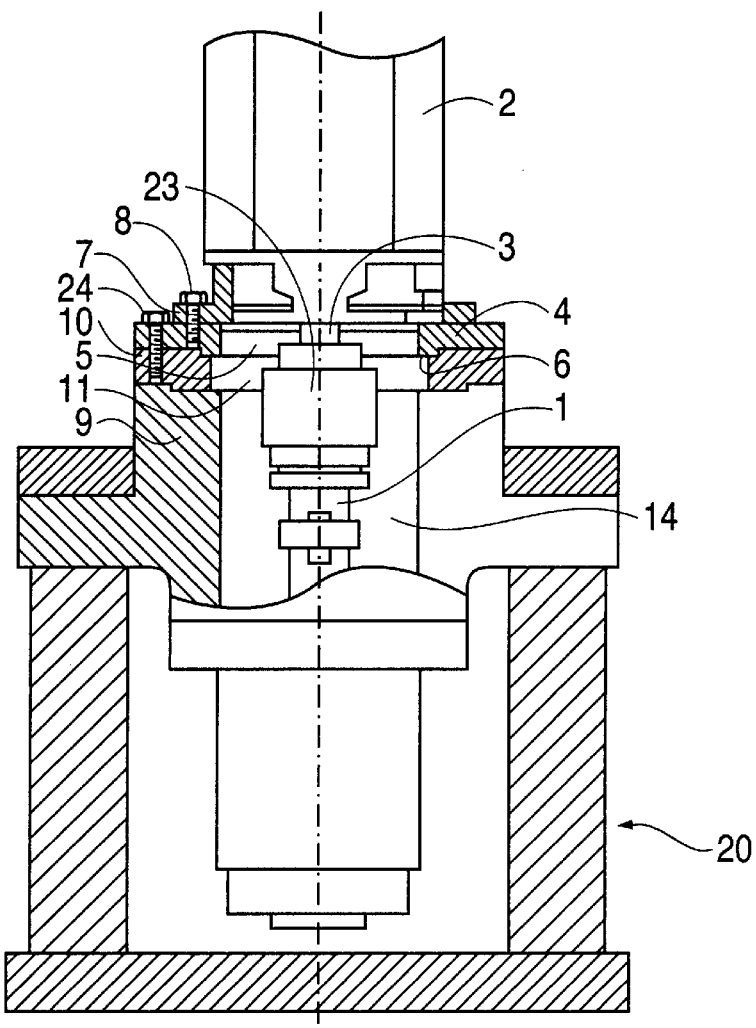
FIG. 1A is a side sectional view showing one embodiment for the case where a centering structure according to the present invention is applied to connection between a main spindle of a machine tool and a spindle motor.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

A centering structure between the shaft of a spindle motor and the main spindle of a machine tool will be described with reference to FIGS. 1A and 1B.

Figure 1B:
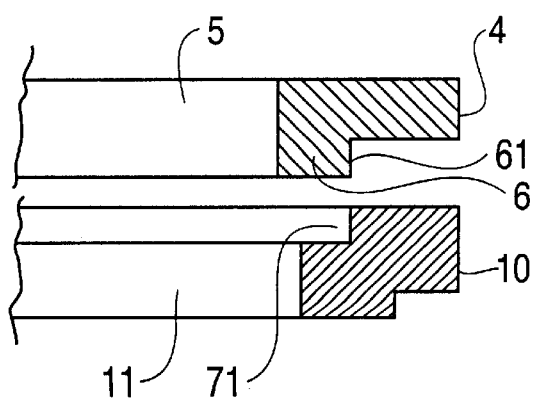
FIG. 1B is a view for illustrating the constructions of first and second mounting plates attached to the machine tool and the spindle motor of FIG. 1A, respectively.

FIG. 1A shows a state in which centering between a motor shaft 3 of a spindle motor 2 and a main spindle 1 of the machine tool is completed. In FIG. 1A, a first mounting plate 4 is attached to a flange portion 7 of the spindle motor 2 by means of bolts 8. Further, a second mounting plate 10 is attached to a housing 9 of the machine tool. The first and second mounting plates 4 and 10 are connected to each other by means of bolts 24.

A circular through hole 5 is formed in the center of the first mounting plate 4. As shown in FIG. 1B, moreover, a ring-shaped projection 6 is formed on the undersurface of the first mounting plate 4 so as to surround the through hole 5. An outer peripheral wall 61 of the ring-shaped projection 6 is finished (e.g., by means of a jig grinder) with particularly high accuracy into the shape of a perfect circle.

The following is a description of a structure for attaching the first mounting plate 4 to the spindle motor 2. The flange portion 7 of the spindle motor 2 is formed with a plurality of threaded holes that are arranged at regular intervals on the circumference of a circle. On the other hand, the first mounting plate 4 is formed with a plurality of tapped holes that are arranged at regular intervals on the circumference of a circle. The bolts 8 are screwed individually into the threaded holes of the flange portion 7, and the respective tip ends of the bolts 8 are screwed individually into the tapped holes of the first mounting plate 4. In consequence, the first mounting plate 4 is attached to the flange portion 7 of the spindle motor 2. The threaded holes of the flange portion 7 are bored so that their diameter is somewhat larger than the nominal diameter of the bolts 8. Thus, the first mounting plate 4 that is coupled to the flange portion 7 of the spindle motor 2 by means of the bolts 8 is allowed to move in some measure with respect to the flange portion 7 (and the bolts 8).

On the other hand, a circular through hole 11 is formed in the center of the second mounting plate 10. A step is provided on the inner peripheral wall of the mounting plate 10 that faces the through hole 11, whereby the inner peripheral wall is divided into two parts, upper and lower portions that are different in diameter. The upper portion of the inner peripheral wall, which has a diameter larger than that of the lower portion, constitutes an expanded portion 71. The inner peripheral wall of the expanded portion 71, like the outer peripheral wall 61 of the ring-shaped projection 6 of the first mounting plate 4, is finished with particularly high accuracy into the shape of a perfect circle whose diameter corresponds to the diameter of the circle of the outer peripheral wall 61 of the ring-shaped projection 6.

The following is a description of a structure for attaching the second mounting plate 10 to the main spindle 1. The second mounting plate 10 is formed with a plurality of countersunk threaded holes that are arranged at regular intervals on the circumference of a circle. On the other hand, the housing 9 of the machine tool is formed with a plurality of tapped holes that are arranged at regular intervals on the circumference of a circle. Bolts 12 (see FIG. 3) are passed individually through the countersunk threaded holes of the second mounting plate 10, and their respective tip ends are screwed individually into the tapped holes of the housing 9. In consequence, the second mounting plate 10 is attached to the housing 9 on the side of the main spindle 1. Each of the threaded holes of the second mounting plate 10 is bored so that its diameter is somewhat larger than the nominal diameter of the bolts 12. Thus, the second mounting plate 10 that is coupled to the housing 9 on the side of the main spindle 1 by means of the bolts 12 is allowed to move in some measure with respect to the housing 9 (and the bolts 12).

Since the ring-shaped projection 6 of the first mounting plate 4 is fitted in the expanded portion 71 of the second mounting plate 10, the diameter of the outer peripheral wall of the ring-shaped projection 6 and the diameter of the inner peripheral wall of the expanded portion 71 must be exactly equalized. Accordingly, the outer peripheral wall 61 of the ring-shaped projection 6 of the first mounting plate 4, for example, is first finished into the shape of a perfect circle. Then, the actual state of engagement with the outer peripheral wall 61 is confirmed as the inner peripheral wall of the expanded portion 71 is finished. Thus, working based on the so-called spot alignment is carried out.

Only the outer peripheral wall 61 of the ring-shaped projection 6 of the first mounting plate 4 and the inner peripheral wall of the expanded portion 71 of the second mounting plate 10 require high finishing accuracy, and the finishing accuracy is not a special problem to other portions of the first and second mounting plates 4 and 10. The respective through holes 5 and 11 of the first and second mounting plates 4 and 11 themselves need not always have the shape of a perfect circle.

If the outer peripheral wall 61 of the ring-shaped projection 6 of the first mounting plate 4 and the inner peripheral wall of the expanded portion 71 of the second mounting plate 10 are formed individually into perfect circles with exactly equal diameters by spot alignment or the like, as mentioned before, when the axis of the motor shaft 3 is aligned with the center of the circle of the outer peripheral wall 61 and further the center of the main spindle 1 is aligned with the center of the circle of the inner peripheral wall of the expanded portion 71, then the axis of the motor shaft 3 and the center of the main spindle 1 are aligned when the outer peripheral wall 61 and the expanded portion 71 are in engagement with each other.

Figure 2:
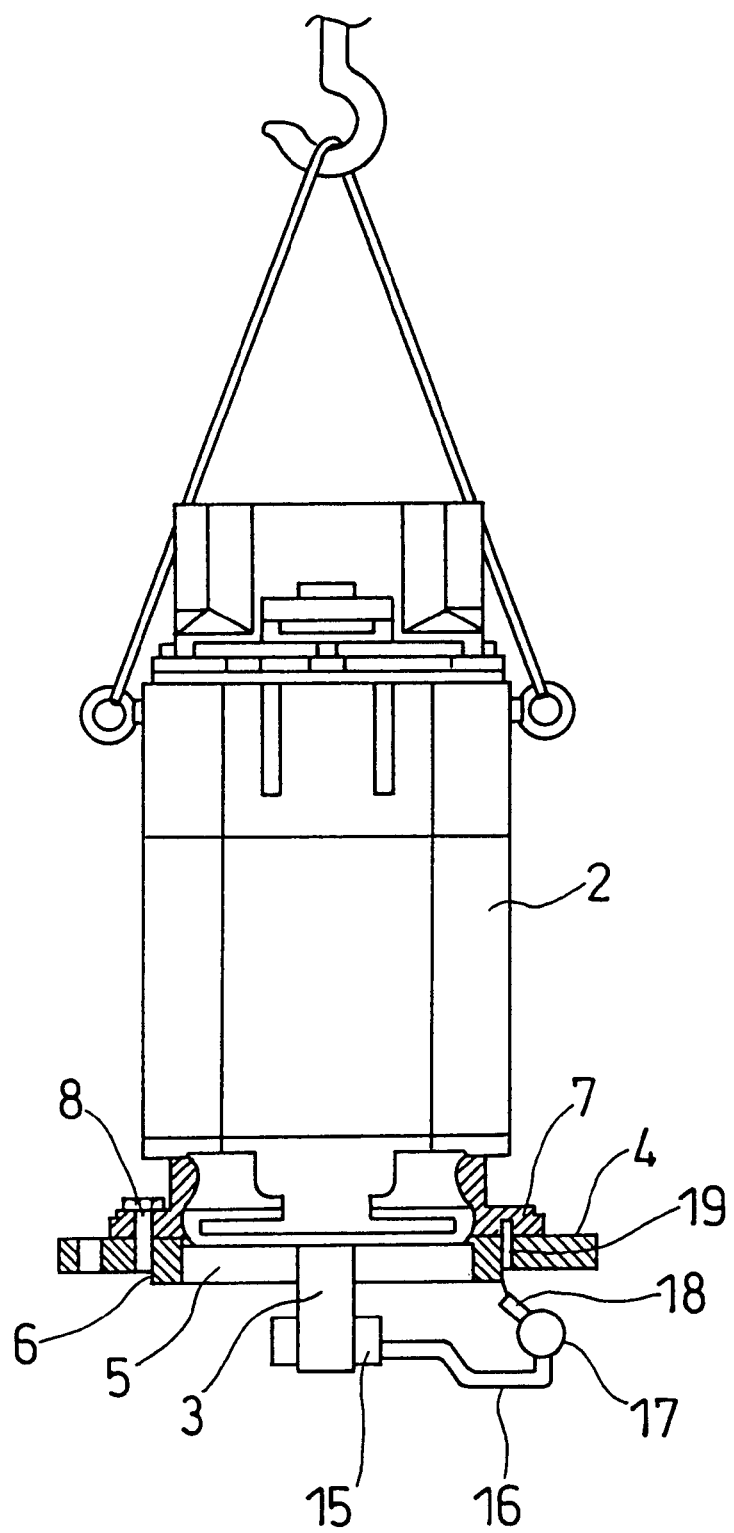
FIG. 2 is a view for illustrating the way centering for the spindle motor and the first mounting plate shown in FIG. 1B is carried out with the first mounting plate attached to the spindle motor.

Referring first to FIG. 2, there will be described an operation for aligning the axis of the motor shaft 3 with the center of the circle of the outer peripheral wall 61 of the ring-shaped projection 6 of the first mounting plate 4.

First, the first mounting plate 4 is fastened beforehand to the spindle motor 2 with a suitable strength by means of the bolts 8 that are passed through the flange portion of the spindle motor 2. Further, the spindle motor 2 is hoisted in advance by means of a crane or the like in a manner such that a wire or the like is engaged with two bolts that are screwed individually to the opposite sides of the upper end portion of the motor and that the axis of the shaft 3 of the spindle motor 2 extends substantially vertically. The suitable strength mentioned above is a strength such that the mounting plate 4 is caused slightly to slide with respect to the flange portion 7 of the spindle motor 2 by impact produced when the outer peripheral portion of the mounting plate 4 is tapped with a resin hammer or copper rod.

Furthermore, the motor shaft 3 is previously fitted with a measurer 17, such as a dial gauge, by means of a suitable fixture 15 and a support 16 so that the measurer 17 can freely turn around the axis of the motor shaft 3. In doing this, the distal end of a pickup 18 of the measurer 17 is pressed in advance against the outer peripheral wall 61 of the ring-shaped projection 6 so that the pointer of the measurer 17 points to any other value than zero.

Then, the motor shaft 3 or the support 16 is manipulated to cause the measurer 17 to make one revolution around the axis of the motor shaft 3 with the distal end of the pickup 18 kept in sliding contact with the outer peripheral wall 61 of the ring-shaped projection 6. If the reading of the pointer of the measurer 17 then changes variously without being kept constant, it indicates that the center of revolution of the measurer 17 (i.e., axis of the motor shaft 3) and the center of the circle of the outer peripheral wall 6 of the ring-shaped projection 6 are not fully aligned.

Accordingly, the measurer is caused to make one revolution or more around the axis of the motor shaft 3, and a measurement position where its reading takes a maximum or minimum value is detected. The outer peripheral portion of the first mounting plate 4 corresponding to the measurement position is tapped toward the shaft 3 with a resin hammer or copper rod, whereby the position of the mounting plate 4 attached to the flange portion 7 is changed.

If the aforesaid operation is repeated several times, the reading of the measurer 17 finally ceases to change while the measurer 17 is turned for a revolution around the axis of the motor shaft 3. In this state, the center of the circle of the outer peripheral wall 61 of the ring-shaped projection 6 and the axis of the motor shaft 3 are in alignment with each other.

Since the spindle motor 2 is hoisted by means of a crane or the like so that its axis is substantially vertical, the first mounting plate 4 can be kept horizontal. Thus, the mounting plate 4 is prevented from moving in an unexpected direction (more specifically, in the direction of action of the force of gravity) by impact produced when the mounting plate 4 is tapped with a resin hammer or copper rod.

After the center of the circle of the outer peripheral wall 61 of the ring-shaped projection 6 are exactly aligned in this manner, the fixture 15, support 16 and measurer 17 are removed, the bolts 8 passed through the flange portion 7 of the spindle motor 2 are tightened firmly, the first mounting plate 4 and the flange portion 7 of the spindle motor 2 are completely fixed together, two or more holes are bored through lap portions of the mounting plate 4 and the flange portion 7, and a knock pin 19 is driven into each of the holes. In some cases, it is inconvenient to keep the posture shown in FIG. 2 in boring the holes and driving the knock pins 19 into the holes, so that it is necessary to remove the spindle motor 2 properly from a crane or the like and throw it down sideways on a workbench.

The knock pins 19 serve to prevent dislocation between the mounting plate 4 and the flange portion 7 attributable to vibration during the operation of the machine, and facilitate reassembling operation that is required after large-scale disassembling operation such that the mounting plate 4 is removed from the flange portion 7. Thus, in carrying out the reassembling operation, the aforesaid measurement and adjustment operations for center alignment need not be performed, and it is necessary only that the flange portion 7 and the mounting plate 4 be positioned with the knock pins 19 used as guides.

Figure 3:
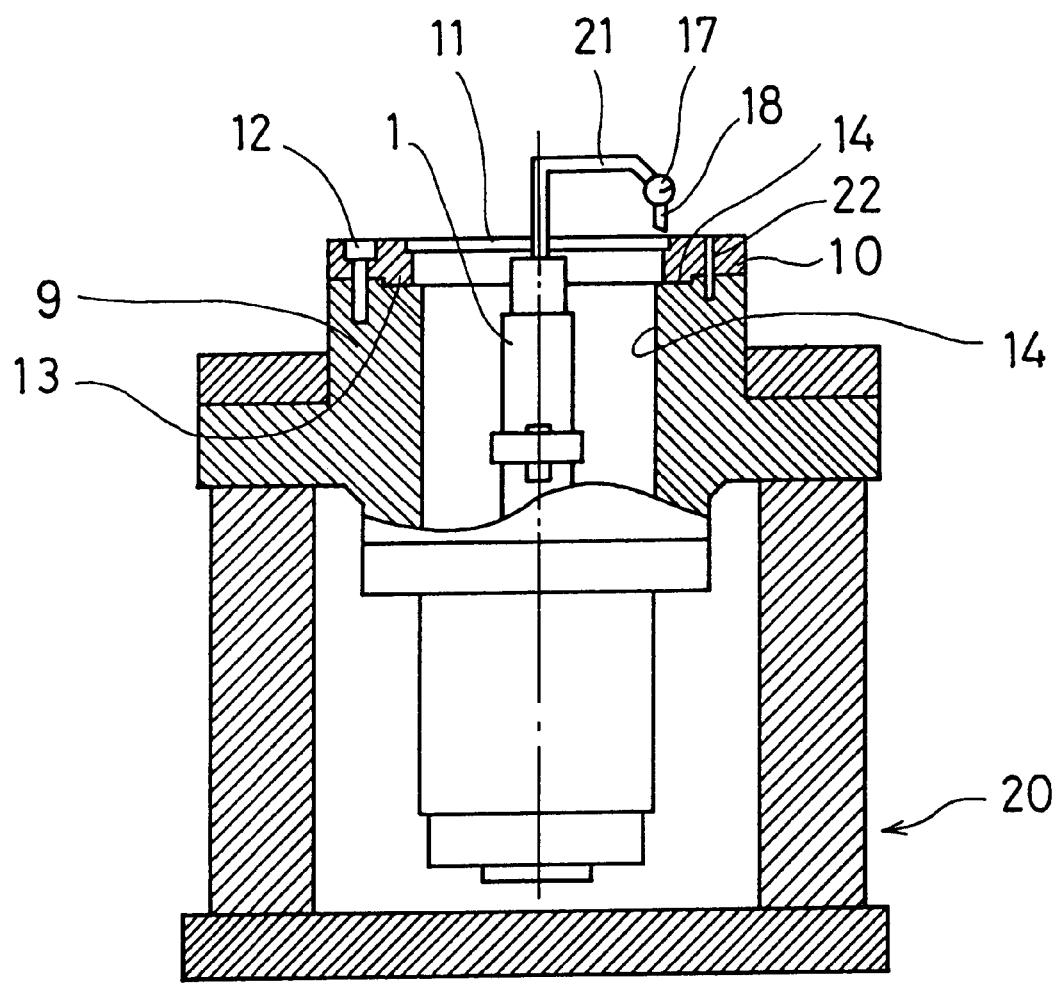
FIG. 3 is a view for illustrating the way centering for the main spindle and the second mounting plate shown in FIG. 1B is carried out with the second mounting plate attached to the machine tool.

Referring now to FIG. 3, operation for aligning the axis of the main spindle 1 with the center of the circle of the inner peripheral wall of the expanded portion 71 of the second mounting plate 10 will be described.

The second mounting plate 10 is fastened to the housing 9 with a suitable strength by means of the bolts 12 that are passed through the upper end face of the housing 9. The suitable strength mentioned above is a strength such that the mounting plate 10 is caused slightly to slide with respect to the housing 9 when the outer peripheral portion of the mounting plate 10 is tapped with a resin hammer or copper rod.

Then, the outer peripheral portion of the housing 9 is supported by means of a cylindrical setting jig 20, as shown in FIG. 3, so that the mounting plate 10 is held in a horizontal posture. Thus, the mounting plate 10 is prevented from moving in an unexpected direction by impact produced when the mounting plate 10 is tapped with a resin hammer or copper rod.

Further, the main spindle 1 is fitted with the measurer 17, such as a dial gauge, by means of a suitable support 21 so that the measurer 17 can freely turn around the axis of the main spindle 1. In doing this, the distal end of the pickup 18 of the measurer 17 is pressed in advance against the inner peripheral wall of the expanded portion 71 of the mounting plate 10 so that the pointer of the measurer 17 points to any other value than zero.

As in the case of the operation (mentioned before) for aligning the axis of the motor shaft 3 with the center of the circle of the outer peripheral wall 61 of the ring-shaped projection 6 of the first mounting plate 4, thereafter, the measurer 17 is caused to make at least one revolution around the axis of the main spindle 1 with the distal end of the pickup 18 kept in sliding contact with the inner peripheral wall of the expanded portion 71 of the mounting plate 10, and fluctuation of the reading of the pointer of the measurer 17 during that operation is examined. While the measurer 17 makes one revolution, a measurement position where its reading takes a maximum or minimum value is detected. The outer peripheral portion of the second mounting plate 10 corresponding to the measurement position is tapped with a resin hammer or copper rod, whereby the position of the mounting plate 10 attached to the housing 9 is changed slightly.

If the aforesaid operation is repeated several times, the reading of the measurer 17 finally ceases to change while the measurer 17 is turned for a revolution around the axis of the main spindle 1. In this state, the center of the circle of the inner peripheral wall of the expanded portion 71 of the mounting plate 10 and the axis of the main spindle 1 are in alignment with each other.

Thereafter, the support 21 and the measurer 17 are removed, the bolts 12 passed through the mounting plate 10 are tightened firmly, the second mounting plate 10 and the housing 9 on the side of the main spindle 1 are completely fixed together, two or more holes are bored through lap portions of the mounting plate 10 and the housing 9, and a knock pin 22 is driven into each of the holes. The knock pins 22 serve to prevent dislocation between the mounting plate 10 and the housing 9 and facilitate reassembling operation.

Finally, a socket 23 having a key or boss-and-serration is interposed between the main spindle 1 and the motor shaft 3, as shown in FIG. 1, and the outer peripheral surface of the peripheral wall 6 and the upper end portion of the inner peripheral surface of the through hole 11 are caused to mate with each other in a manner such that the first mounting plate 4 is put on the second mounting plate 10 on side of the housing 9. Thereupon, the respective centers of the motor shaft 3 and the main spindle 1 are aligned completely.

The first and second mounting plates 4 and 10 are finally fixed together by screwing the bolts 24, which are passed through threaded holes arranged at regular intervals on the periphery of the first mounting plate 4, into tapped holes in the second mounting plate 10 corresponding to their respective positions, as shown in FIG. 1.

According to the embodiment described above, the outer peripheral wall 61 of the ring-shaped projection 6 of the first mounting plate 4 is formed into the shape of a perfect circle, and the first mounting plate 4 is coupled to the motor flange portion 7 so that the axis of the motor shaft 3 is in alignment with the center of the circle of the outer peripheral wall 61 (first measurement portion). Further, the inner peripheral wall of the expanded portion 71 of the second mounting plate 10 is formed into the shape of a perfect circle having a diameter corresponding to the diameter of the circle of the outer peripheral wall 61 of the ring-shaped projection 6 of the first mounting plate 4, and the second mounting plate 10 is coupled to the spindle-side housing 9 so that the axis of the main spindle 1 is in alignment with the center of the circle of the inner peripheral wall (second measurement portion) of the expanded portion 71. Since the inner peripheral wall of the expanded portion 71 of the second mounting plate 10, having the shape of a perfect circle, receives the outer peripheral wall 61 of the ring-shaped projection 6 of the first mounting plate 4, having the shape of a perfect circle with the same diameter, the respective centers of the motor shaft 3 and the main spindle 1 can be aligned with very high accuracy, e.g., within a tolerance range of about 1 micron to 10 microns.

Figure 1C:
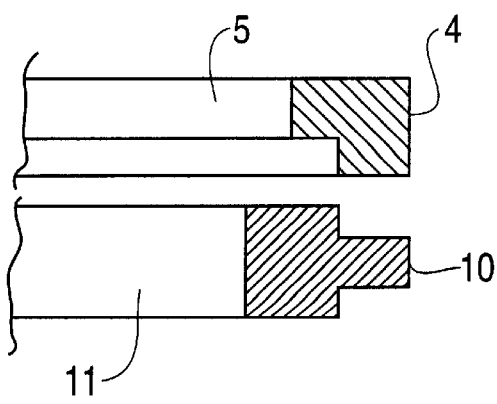
FIG. 1C is a view for illustrating the constructions of first and second mounting plates having shapes different from those of the mounting plates shown in FIG. 1B.

In the embodiment described therein, the first mounting plate 4 has the ring-shaped projection 6, and the second mounting plate is provided with the inner peripheral wall expanded portion 71. Alternatively, however, an expanded portion may be formed on the lower part of the inner peripheral wall of the first mounting plate 4 that faces the center through hole thereof, and a ring-shaped projection on the second mounting plate 10 so as to face the center through hole thereof, as shown in FIG. 1C. The inner peripheral wall of the expanded portion and the outer peripheral wall of the ring-shaped projection are finished in the same manner as in the aforementioned case.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A centering structure between a machine-side spindle and a motor shaft, the machine-side spindle having a housing and the motor shaft is connected to a motor, comprising:

first and second mounting plates each having a through hole bored through the central portion thereof and provided individually with fitting portions adapted to mate with each other with the respective centers of the through holes thereof in alignment;

wherein said first mounting plate and the motor being fixed together in a manner such that the center of the through hole of said first mounting plate and the center of the motor shaft are in alignment with each other;

wherein said second mounting plate and the housing for the machine-side spindle being fixed together in a manner such that the center of the through hole of said second mounting plate and the center of the machine-side spindle are in alignment with each other; and wherein said first and second mounting plates being caused to mate with each other by said fitting portions so that the center of the machine-side spindle and the center of the motor shaft are in alignment with each other.

2. A centering structure between a shaft of a first apparatus and a shaft of a second apparatus, comprising:

a first mounting plate having a first engaging portion;

a second mounting plate having a second engaging portion, which can engage said first engaging portion;

said first engaging portion having a first engaging surface on a part thereof; and said second engaging portion having a second engaging surface on apart thereof, shaped corresponding to the first engaging surface;

wherein said first mounting plate being attached to the first apparatus in a manner such that the position of the axis of the shaft of the first apparatus is settled on the basis of the first engaging surface, the second apparatus being attached to said second mounting plate in a manner such that the position of the axis of the shaft of the second apparatus is settled on the basis of the second engaging surface, and said first and second mounting plates being coupled to each other in a manner such that said first engaging portion of said first mounting plate is caused to engage said second engaging portion of said second mounting plate and the axes of the shafts of the first and second apparatus are aligned.

3. A centering structure between a first shaft of a first apparatus and a second shaft spindle of a second apparatus, comprising:

a first mounting plate having a first engaging portion;

a second mounting plate having a second engaging portion, which can engage said first engaging portion;

said first engaging portion having a first engaging surface in the shape of a perfect circle on a part thereof;

said second engaging portion having a second engaging surface on a part thereof in the shape of a perfect circle with a diameter corresponding to the diameter of the first engaging surface;

said first apparatus being fixed on said first mounting plate so that the axis of the first shaft of the first apparatus is in alignment with the center of the perfect circle of the first engaging surface, said second apparatus being fixed on said second mounting plate so that the axis of the second shaft of the second apparatus is in alignment with the center of the perfect circle of the second engaging surface, and said first and second mounting plates being coupled to each other in a manner such that said first engaging portion of said first mounting plate is caused to engage said second engaging portion of said second mounting plate.

4. The centering structure according to claim 3, wherein said first engaging portion is a ring-shaped projection formed on one surface of said first mounting plate, and the first engaging surface is the outer peripheral wall of the ring-shaped projection.

5. The centering structure according to claim 4, wherein said second engaging portion is an expanded portion formed having a step on a part of an inner peripheral wall facing a through hole formed in the center of said second mounting plate, and the second engaging surface is the inner peripheral wall of the expanded portion.

6. A method of aligning a first shaft of a first apparatus and a second shaft spindle of a second apparatus, comprising:

fastening a first mounting plate to the first shaft, the first mounting plate having a first through hole and a first fitting portion, wherein a central axis of the first shaft is aligned with a center of the first through hole;

fastening a second mounting plate to the second shaft spindle, the second mounting plate having a second through hole and a second fitting portion, wherein a central axis of the second shaft spindle is aligned with a center of the second through hole; and combining the first and second mounting plates, wherein the first fitting portion is received by the second fitting portion such that the centers of the first and second through holes are aligned along an axis common to the central axes of the first shaft and the second shaft spindle.

7. The method of aligning of claim 6, wherein the first mounting plate is fastened to the first shaft in accordance with:

placing a measurer in communication with the central axis of the first shaft and the first fitting portion;

rotating the measurer about the central axis of the first shaft in order to reveal a degree of alignment between the center of the first through hole and the central axis of the first shaft; and adjusting the first mounting plate such that the degree of alignment indicates that the center of the first through hole is aligned with the central axis of the first shaft.

8. The method of aligning of claim 7, wherein the first mounting plate is fastened to the first shaft further in accordance with hoisting the first shaft such that the central axis of the first shaft is vertical; and attaching the first mounting plate to the first shaft such that the first mounting plate is horizontal.

9. The method of aligning of claim 6, wherein the second mounting plate is fastened to the second shaft spindle in accordance with:

placing a measurer in communication with the central axis of the second shaft spindle and the second fitting portion;

rotating the measurer about the central axis of the second shaft spindle in order to reveal a degree of alignment between the center of the second through hole and the central axis of the second shaft spindle; and adjusting the second mounting plate such that the degree of alignment indicates that the center of the second through hole is aligned with the central axis of the second shaft spindle.

10. The method of aligning of claim 9, wherein the second mounting plate is fastened to the second shaft spindle further in accordance with:

hoisting the second shaft spindle such that the central axis of the second shaft spindle is vertical; and attaching the second mounting plate to the second shaft spindle such that the second mounting plate is horizontal.

* * * * *